US012801727B2

(12) United States Patent
Scott et al.

(10) Patent No.: US 12,801,727 B2
(45) Date of Patent: Nov. 17, 2026

(54) SYSTEMS AND METHODS FOR CYBERSECURITY INCIDENT DETECTION AND MITIGATION

(71) Applicant: International Business Machines Corporation, Armonk, NY (US)

(72) Inventors: Paul Andrew Scott, Calgary (CA); Allen Gerald Saurette, Calgary (CA); James Douglas Lautner, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/732,889

(22) Filed: Jun. 4, 2024

(65) Prior Publication Data

US 2025/0181708 A1 Jun. 5, 2025

Related U.S. Application Data

(60) Provisional application No. 63/605,840, filed on Dec. 4, 2023.

(51) Int. Cl.
*G06F 21/54* (2013.01)
*G06F 21/55* (2013.01)

(52) U.S. Cl.
CPC ............ *G06F 21/54* (2013.01); *G06F 21/554* (2013.01)

(58) Field of Classification Search
CPC ............................... G06F 21/54; G06F 21/554
See application file for complete search history.

(56) References Cited

U.S. PATENT DOCUMENTS

| | | | |
|---|---|---|---|
| 10,229,269 | B1 | 3/2019 | Patton et al. |
| 10,262,138 | B2 | 4/2019 | Boutnaru |

(Continued)

FOREIGN PATENT DOCUMENTS

| | | | |
|---|---|---|---|
| JP | 2021012648 A | | 2/2021 |
| KR | 20170119903 A | * | 10/2017 |
| KR | 1020210001057 A | | 1/2021 |

OTHER PUBLICATIONS

Kim, D.-Y. et al., "White list-based ransomware real-time detection and prevention for user device protection," 2018 IEEE International Conference on Consumer Electronics (ICCE), Las Vegas, NV, USA, (2018), pp. 1-5, DOI: 10.1109/ICCE.2018.8326119.

(Continued)

*Primary Examiner* — Rupal Dharia
*Assistant Examiner* — Raghavender Cholleti
(74) *Attorney, Agent, or Firm* — Cantor Colburn LLP; Tihon Poltavets

(57) ABSTRACT

Various embodiments for detecting and interrupting execution of a suspicious process are disclosed herein. The embodiments disclosed involve defining a first trigger event relating to a threshold count of a cryptographic operations, monitoring a cryptographic operation counter for the process, determining that the process has executed the first trigger event, and determining whether the process is included in a whitelist of permitted processes. If the process is not included in the whitelist, execution of the process is suspended, a first determination procedure is initiated, an input from the first determination procedure is received and based on a determination from the first determination procedure, the process is either cancelled or permitted to continue executing. Various embodiments involving defining a plurality of trigger events, monitoring the execution of (Continued)

the first process are also disclosed, updating the whitelist and mitigating harm done by a cancelled process are disclosed.

19 Claims, 7 Drawing Sheets

(56) References Cited

U.S. PATENT DOCUMENTS

| | | | | |
|---|---|---|---|---|
| 10,311,234 | B2 | 6/2019 | Bhashkar et al. | |
| 10,432,405 | B1 * | 10/2019 | Hu | H04L 9/3242 |
| 10,893,068 | B1 | 1/2021 | Khalid et al. | |
| 10,929,537 | B2 | 2/2021 | Carson | |
| 11,082,444 | B2 | 8/2021 | Macleod et al. | |
| 11,200,314 | B2 | 12/2021 | Ellam et al. | |
| 11,714,907 | B2 | 8/2023 | Edwards et al. | |
| 11,720,678 | B2 | 8/2023 | Underwood et al. | |
| 2007/0226806 | A1 * | 9/2007 | Tung | H04L 9/0891 713/193 |
| 2010/0132038 | A1 * | 5/2010 | Zaitsev | H04L 63/1433 703/22 |
| 2013/0185797 | A1 * | 7/2013 | Zhou | G06F 21/52 726/23 |
| 2018/0278624 | A1 * | 9/2018 | Kuperman | H04L 9/3271 |
| 2019/0347418 | A1 * | 11/2019 | Strogov | G06F 21/44 |
| 2020/0074121 | A1 * | 3/2020 | Fu | G06F 21/33 |
| 2020/0313881 | A1 * | 10/2020 | Feng | H04L 63/0861 |
| 2020/0319979 | A1 * | 10/2020 | Kulaga | G06F 11/1451 |
| 2021/0182392 | A1 | 6/2021 | Hargrove | |
| 2022/0222338 | A1 | 7/2022 | Gupta | |
| 2022/0329409 | A1 * | 10/2022 | Collinge | H04L 67/1097 |
| 2023/0297678 | A1 | 9/2023 | Martinic | |
| 2023/0401134 | A1 * | 12/2023 | Gupta | G06F 9/5027 |

OTHER PUBLICATIONS

Mcintosh, Timothy et al., "Dynamic user-centric access control for detection of ransomware attacks," Computers & Security, vol. 111 (2021), 102461, pp. 1-22, DOI:/10.1016/j.cose.2021.102461.

* cited by examiner

SYSTEMS AND METHODS FOR CYBERSECURITY INCIDENT DETECTION AND MITIGATION

CROSS-REFERENCE TO RELATED APPLICATIONS

This application claims the benefit of U.S. Provisional Application No. 63/605,840 filed on Dec. 4, 2023, which is incorporated by reference herein in its entirety.

FIELD

The described embodiments relate to systems and methods for detecting and mitigating cybersecurity incidents

BACKGROUND

The following is not an admission that anything discussed below is part of the prior art or part of the common general knowledge of a person skilled in the art.

Computing systems that manage secure data and transactions are frequently subjected to cybersecurity attacks. The effect of such attacks can be debilitating to the operation of a company, government or other institution. In a common form of cyberattack, a hacker surreptitiously installs a rogue process on an institution's computer system. When the rogue process is executed, it accesses and encrypts data that is essential to the operations of the institution. The hacker then demands a ransom payment to provide the institution with decryption keys that will allow the institution to regain access to its data. Existing methods for identifying such cyberattacks are able to identify the attack after the fact by identifying data that has been encrypted. However, by that point, the harm is done—the data is already encrypted. There is a need for systems and methods that can detect a cyberattack and limit the harm done.

SUMMARY

The various embodiments described herein related generally to computer implemented systems for identifying a suspicious computer process executing on a computer system and for conducting a cybersecurity risk assessment procedure to determine if a suspicious procedure should be cancelled.

A suspicious process may be identified by determining that the suspicious process has performed a trigger event. For example, a trigger event may be to request that a cryptographic operation be performed by a cryptographic module. A cryptographic module may, for example, be a hardware cryptographic security module. The cryptographic module maintains a record of cryptographic operations performed at the request of processes executing on computer system. For example, the cryptographic module may maintain a count of cryptographic operations performed at the request of a process. An incident module may determine that a process has performed a trigger event if the number of cryptographic operations performed for a process exceeds a threshold, which may be zero or a higher number of cryptographic operations.

If a process is determined to have performed a trigger event, the incident module determines if the process is on a whitelist of permitted processes. If so, the process is permitted to execute. If not, the process is suspended and a cybersecurity risk assessment procedure is implemented. If the result of the cybersecurity risk assessment process is that the process is safe to execute, it is resumed. Otherwise, the process is cancelled.

In some embodiments, after a process is initially permitted to execute, it may be monitored to determine if it performs another trigger event, in which case the process is subjected to a cybersecurity risk assessment procedure.

In some embodiments, a process that is not on the whitelist, but is permitted to execute after a cybersecurity risk assessment procedure, is added to the whitelist.

In some embodiments, after cancelling a process, an attempt is made to mitigate damage done by the suspicious process. The incident module may attempt to identify data modified by the process and revert the data back to a previous known good version of the data.

In some embodiments, a process that is cancelled is added to a blacklist of unpermitted processes. Subsequently, if the process attempts to execute again, it can be identified as being on the blacklist and cancelled.

In one aspect, some embodiments provide a computer implemented method for detecting and interrupting a suspicious process, the method comprising: defining a first trigger event, wherein the first trigger event relates to a threshold count of cryptographic operations; monitoring a cryptographic operation counter for the process; determining that the process has executed the first trigger event; determining whether the process is included in a whitelist of permitted processes; and if the process is not included in the whitelist, then: suspending execution of the process; initiating a first determination procedure; receiving an input from the first determination procedure; and based on a determination from the first determination procedure, either cancelling the process or permitting the process to continue executing.

In some embodiments, the threshold count of cryptographic operations is one.

In some embodiments, the computer implemented method further includes: defining a second trigger event, wherein the second trigger event relates to a threshold count of cryptographic operations; and after the process has been permitted to continue executing: determining that the process has executed the second trigger event, suspending execution of the process; initiating a second determination procedure; receiving an input from the second determination procedure; and based on a determination from the second determination procedure, either cancelling the process or permitting the process to continue executing.

In some embodiments, the second trigger event relates to a process exceeding a count of cryptographic operations.

In some embodiments, the second trigger event relates to a process exceeding a count of cryptographic operations by a specified amount.

In some embodiments, the computer implemented method includes, after cancelling the process, attempting to mitigate modifications made by the process to data stored in a protected data store.

In some embodiments, mitigating modifications made by the process includes replacing modified data with previous versions of the data.

In some embodiments, the computer implemented method includes determining whether the process is on a blacklist of processes; and if the process is on the blacklist of processes, then cancelling the process.

In some embodiments, the computer implemented method includes assembling the whitelist of permitted processes by allowing a plurality of known processes to execute and creating a record for each of the known processes based on whether the processes perform any trigger events.

In a second aspect, some embodiments provide a computer implemented method for detecting and interrupting a suspicious process, the method comprising: defining a plurality of trigger events; identifying that a first process has been initiated to execute; monitoring the execution of the first process; determining that the first process has executed one of the trigger events; determining whether the first process is included in a whitelist of permitted processes; and if the process is not included in the whitelist of permitted processes, then: suspending execution of the process; initiating a determination procedure; receiving an input from the determination procedure; and based on a determination from the determination procedure, either cancelling the process or allowing the process to continue executing.

In some embodiments, at least a first trigger event of the trigger events relates to a threshold count of cryptographic operations.

In some embodiments, the threshold count of cryptographic operations is one.

In some embodiments, the computer implemented method includes defining a second trigger event, wherein the second trigger event relates to a threshold count of cryptographic operations; and after the process has been permitted to continue executing: determining that the process has executed the second trigger event, suspending execution of the process; initiating a second determination procedure; receiving an input from the second determination procedure; and based on a determination from the second determination procedure, either cancelling the process or permitting the process to continue executing.

In some embodiments, the second trigger event relates to a process exceeding a count of cryptographic operations.

In some embodiments, the second trigger event relates to a process exceeding a count of cryptographic operations by a specified amount.

In some embodiments, the computer implemented method includes, after cancelling the process, attempting to mitigate modifications made by the process to data stored in a protected data store.

In some embodiments, mitigating modifications made by the process includes replacing modified data with previous versions of the data.

In some embodiments, the computer implemented method includes determining whether the process is on a blacklist of processes; and if the process is on the blacklist of processes, then cancelling the process.

In some embodiments, the computer implemented method further includes assembling the whitelist of permitted processes by allowing a plurality of known processes to execute and creating a record for each of the known processes based on whether the processes perform any trigger events.

These and other aspects are explained further in the description of various example embodiments.

BRIEF DESCRIPTION OF THE DRAWINGS

Several embodiments are described below with reference to the drawings, in which.

DESCRIPTION OF EXAMPLE EMBODIMENTS

Figure 1:
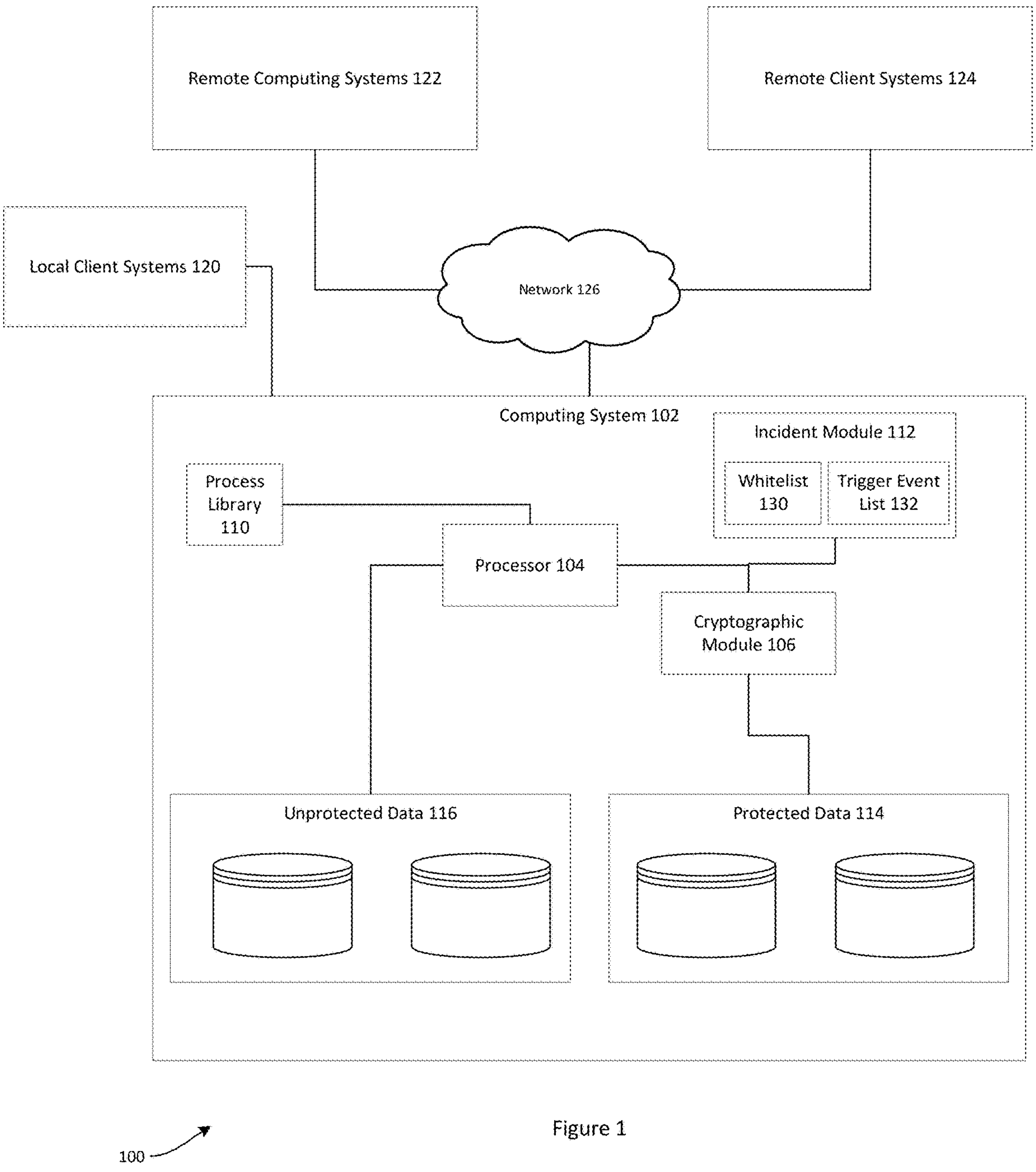
FIG. 1 is a block diagram of a computing system and various local and remote computing systems.

Various example embodiments are described herein. Numerous specific details are set forth in order to provide a thorough understanding of the example embodiments. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as “substantially”, “about” and “approximately” when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording “and/or” is intended to represent an inclusive-or. That is, “X and/or Y” is intended to mean X or Y or both, for example. As a further example, “X, Y, and/or Z” is intended to mean X or Y or Z or any combination thereof.

The terms “including,” “comprising” and variations thereof mean “including but not limited to,” unless expressly specified otherwise. A listing of items does not imply that any or all of the items are mutually exclusive, unless expressly specified otherwise. The terms “a,” “an” and “the” mean “one or more,” unless expressly specified otherwise.

As used herein and in the claims, two or more elements are said to be “coupled”, “connected”, “attached”, or “fastened” where the parts are joined or operate together either directly or indirectly (i.e., through one or more intermediate parts), so long as a link occurs. As used herein and in the claims, two or more elements are said to be “directly coupled”, “directly connected”, “directly attached”, or “directly fastened” where the element are connected in physical contact with each other. None of the terms “coupled”, “connected”, “attached”, and “fastened” distinguish the manner in which two or more elements are joined together.

The terms “an embodiment”, “embodiment”, “embodiments”, “the embodiment”, “the embodiments”, “one or more embodiments,” “some embodiments”, “various embodiments” and “one embodiment” and other similar terms mean “one or more (but not all) embodiments of the present invention(s),” unless expressly specified otherwise.

The embodiments of the systems and methods, and components of the systems and methods, described herein may be implemented in hardware or software, or a combination of both. These embodiments, or portions of some components of the embodiments, may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and any combination thereof.

Program code may be applied to input data to perform the functions described herein and to generate output information. The output information is applied to one or more output devices, in known fashion.

Each program may be implemented in a high-level procedural or object oriented programming and/or scripting language, or both, to communicate with a computer system. The programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

In the description herein, the term "article" is used to refer to an object that is being manufactured, produced, packaged, transported, and/or distributed etc. As used herein, the term "article" may refer to a product and/or a package containing a product. An "article" may refer to a product that is intended to be received/used by a retailer, distributor and/or end-user and/or the entire package that may be received by a retailer, distributor and/or end-user including external packaging and/or containers and the goods/products contained therein.

Reference is made to FIG. 1, which illustrates an example computing environment 100 that includes a central computing system 102 and a plurality of local and remote client computing systems coupled to central computing system 102. The central computing system 102 includes a processor 104, a cryptographic module 106, a process library 110, a cybersecurity incident module 112, a protected data store 114 and an unprotected data store 116.

The computing system 102 may be a commercial computing system, such as a mainframe computer, or any other type of computing system. In some embodiments, computing system 102 may be an integrated system assembled in a single unit, or it may be a modular system assembled in on more racks or housings. In some embodiments, computing system 102 may be a distributed computing system in which various components (or portions of some components) are situated in different assemblies, housings or locations and are coupled together to provide the functionality of the computing system. In some embodiments, the various components may be coupled together through a communication network. In various embodiments, some of the elements of computing system 102 may be virtualized or provided through a remote service, such as a cloud computing or cloud services system.

Processor 104 is configurable to execute software including processes stored in process library 110. When executing a process, processor 104 may access and modify data stored in the protected data store 114 and unprotected data store 116. In various embodiments, a computing system 102 may include any number of processors 104 to provide sufficient computing capability to serve the needs of the system 100.

Data stored in protected data store 114 is maintained in an encrypted or secured state such that it cannot be understood without being decrypted using a secure decryption key. Access to data stored in protected data store 114 is restricted and is available only through cryptographic module 106. To modify or access data stored in the protected data store 114, a process executing on processor 104 must make a request to the cryptographic module 106, which processes the request and, if required and authorized, returns data to the process.

Cryptographic module 106 is configured to encrypt data before storing it in the protected data store 114 and can decrypt the stored data for use by the processor 104. Cryptographic module 106 may be implemented in hardware, software, firmware or a combination of them. For example, in some mainframe computing systems, a cryptographic module may be implemented as a hardware security module (such as an IBM Crypto Card or Cryptographic Coprocessor).

Incident module 112 monitors the use of the cryptographic module 106 by the processor 104 and by processes running on the processor 104. The operation of incident module 112 is further explained below.

The processes executing on processor 104 will typically provide specific functions or services required by the operator of the computing environment. For example, in a financial transactions environment, at least some of the processes in the process library may provide, for example, the functionality of assessing whether an account holder has sufficient funds or credit to enter into a transaction; to record debits, credits, transaction authorizations, transaction completions, payments and other transactions against financial accounts; and to create, suspend or cancel accounts. Typically, financial account information is organized in a database in a protected data store and authorized processes executed on a processor can access and modify the financial account information through a cryptographic module.

The computing environment 100 may include one or more local client computing systems 120 coupled to the computing system 102 through a communication network, which may typically be a local area network or other network suitable for local communication connections. Local client systems 120 may be permitted to control the operation of computing system (typically with limitations corresponding to permissions granted to a user of a local client system or to a process operating on the local client system). For example, a user operating a local client system may be able to initiate the execution of a process on the local computing system 102. The computing environment 100 may include one or more remote computing systems 122, which may have a structure and functionality similar to computing system 102. The computing environment 100 may also include one or more remote client systems 124 which may have functionality similar to the local client systems. The remote computing system 122 and remote client systems 124 may be coupled to the computing system 102 through a communication network 126, which may include any number or combination of communication links. A client system may be coupled to the local computing system for various purposes including to manage, control or monitor the operation of the local computing system, exchange data, software and other information or various other purposes. In various embodiments, some of the client systems 120, 124 may operate as a standalone computing system or as a terminal device coupled to the local computing system 102, or both. In some embodiments, the client systems may use a terminal emulation application to connect to the computing system 102.

Figure 2:
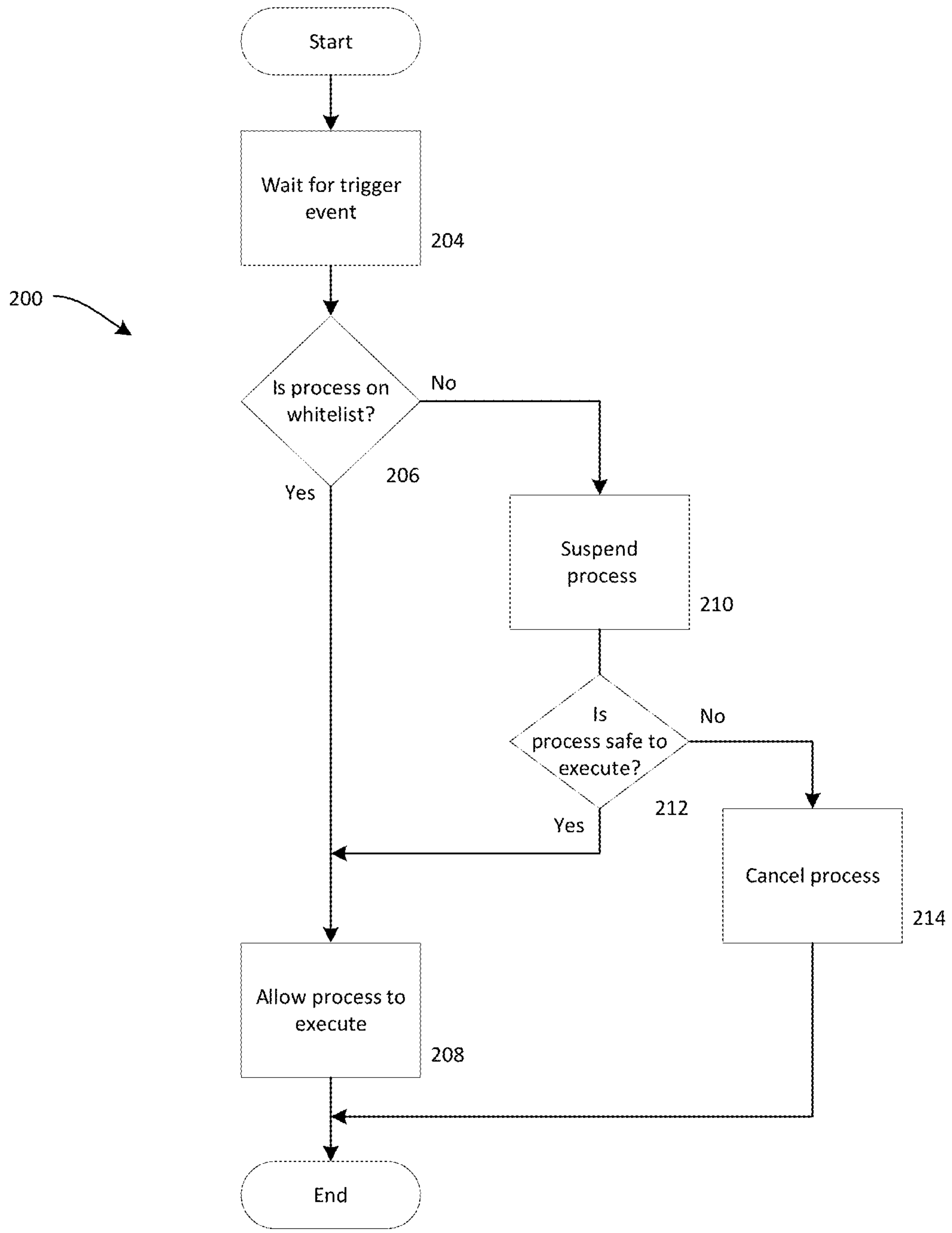
FIG. 2 illustrates a method of identifying a suspicious process and performing a cryptographic risk assessment procedure.

Reference is made to FIG. 2, which illustrates a method 200 by which an incident module 112 may detect and interrupt a process that is a potential cybersecurity threat in a computing system 102.

Method 200 begins at 204, in which the incident module 112 detects that a trigger event has occurred in relation to an executing process.

The cryptographic module 106 maintains a cryptographic operation counter for each process that has requested a cryptographic operation to be performed by the cryptographic module. The counter is initialized when a process first requests a cryptographic operation and is incremented each time the process makes a request for a cryptographic operation. The cryptographic operation counter provides a running count of the number of cryptographic operations requested by a process while it is executing. A new counter is initialized and kept up to date each time a process is instantiated.

A cryptographic operation may be any action that utilizes the cryptographic module 106 to access or modify data stored in the protected data store 114. For example, a process may request the cryptographic module 106 to store new data in the protected data store 114. In response, the cryptographic module 106 may encrypt the new data and record it in the protected data store 114. A process may request the cryptographic module 106 to decrypt data in the protected data store. In response, the cryptographic module 106 may complete the requested action. Each of these encrypt and decrypt operations is a cryptographic operation. In some embodiments, other operations performed by the cryptographic module may also be considered to be cryptographic operations. For example, in some embodiments, adding, modifying or deleting data in the protected data store 114 may be considered to be a cryptographic operation.

The incident module 112 maintains a trigger event list 132 of trigger events that indicate that a process may require additional scrutiny to determine whether it poses a cybersecurity risk. For example, a trigger event may be that a process has requested a cryptographic operation be performed by the cryptographic module 106, and therefore the cryptographic operation counter for the process is one or higher. The incident module 112 monitors the relevant activity of processes to determine if a process has performed, requested or otherwise taken or activated an action, that corresponds to a trigger event.

The incident module 112 monitors the cryptographic operations counters maintained by the cryptographic module 106. When a cryptographic operations counter indicates that a new process has performed a trigger event (i.e. requested the cryptographic operations module to perform a cryptographic operation), the incident module 112 conducts a risk assessment or determination procedure.

In various embodiments, the incident module 112 may determine that a trigger event has occurred in various ways, which may depend on the nature of the trigger event. For example, the incident module 112 may monitor a list of executing processes maintained by an operating system that controls the operation of computing system 102. When a new process appears on the executing processes list, the incident module 112 may monitor its operation to determine if a trigger event has occurred.

If a process performs a trigger event, method 200 proceeds to 206. The incident module 112 maintains a whitelist 130 of processes that are allowed or permitted to execute on computing system 102. The whitelist 130 includes a record for each process that has previously been permitted to execute on computing system 102. Processes will typically be permitted by a user of the system that is authorized to identify permitted processes. The record for a permitted process may include information that can be used to securely identify the process. For example, the record for a process may include the name of the process and the userid who ran the process. In various embodiments, the whitelist record for a permitted process may include additional information about the executable file for the process, such as the length of the executable file or information about the expected behavior of the file, a hash of the executable file for the process. This information can be useful to identify a rogue process that has the same name as a permitted process, but which has a different file length or hash.

The incident module 112 determines if the process is on the whitelist 130 of permitted processes. If so, the process is a permitted process, and method 200 proceeds to 208. If not, the process is a suspicious process and method 200 proceeds to 210.

At 208, the permitted process is permitted to continue executing.

At 210, the incident module suspends the suspicious process from further execution. For example, all further processing for the suspicious process may be stopped such that the suspicious process cannot execute any further instructions on the processor 104 or make any changes in computing system 102. By suspending the suspicious process, the incident module prevents the suspicious process from potentially accessing or damaging protected data stored in the protected data store, and possibly from doing other harm to computing system 102 or other components of system 100.

Method 200 then proceeds to 212, in which the incident module 112 performs a cybersecurity determination procedure.

Figure 3:
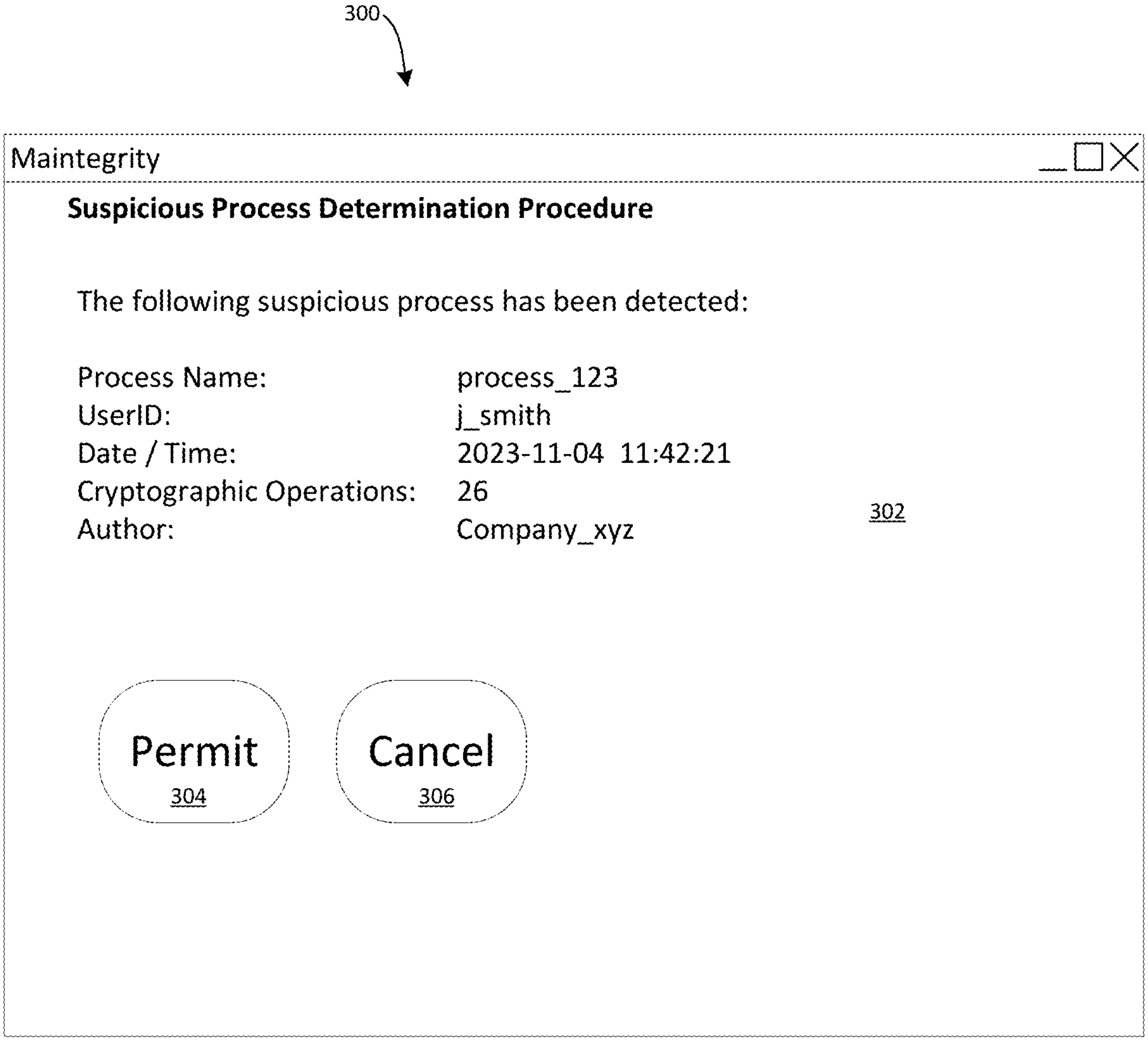
FIG. 3 illustrates a user interface that may be displayed during the method of FIG. 2.

Reference is made to FIG. 3, which illustrates a user interface screen or window 300 for a cybersecurity determination process. In one example of a cybersecurity determination procedure, the incident module 112 may present information to a user of system 100 or computing system 102 identifying the suspicious process and optionally, additional information about the suspicious process that may be useful to the user in determining whether the suspicious process should be permitted to execute or should be cancelled. For example, the incident module 112 will display this information on a display screen visible to the user or transmit the information to the user in an e-mail or other message. For example, in window 302, the incident module 112 is displaying information about a suspicious process including the process name and userid by which the process was instantiated, the date and time at which the process was instantiated, the number of cryptographic operations performed by cryptographic module 106 for requests from the suspicious process. The window 302 also has a "Permit" button 304 and a "Cancel" button 306. In various embodiments, other information may be presented including the identity of specific protected data that the suspicious process has accessed or attempted to access, or the number and type of cryptography events completed by the suspicious process before it was suspended. The incident module 112 then waits for the user to indicate that the suspicious process should be permitted to execute (by clicking the Permit button) or cancelled (by clicking the Cancel button).

If the suspicious process is permitted to execute, it is no longer considered a suspicious process and is permitted to execute at 208. If the suspicious process is to be cancelled, then method 200 proceeds to 214.

At 214, the suspicious process is cancelled so that it cannot request any further cryptography operations. Method 200 then ends.

In various embodiments, window 302 may display additional information such as a breakdown of cryptographic operations into different types of operations or the author of the process. In some embodiments and situations, a suspicious process may be able to perform more than one cryptographic operation between performing a trigger event at 204 and being interrupted at 210. Method 200 provides a process for identifying, suspending and cancelling the execution of rogue processes that attempts to access or modify protected data stored in the protected data store. In method 200, the trigger event used to identify a process as potentially suspicious is that the process requests the cryptographic module 106 to perform a cryptographic operation and the process is not included on the whitelist 130.

In various embodiments, other trigger events may be used to determine whether a process may present a cryptographic threat and should be treated as a suspicious process. For example, computing system 102 may receive threat indications from other computing systems or another third party system or service. The external computing system or service may provide a threat warning or indication to the computing system 102. The incident module 112 may receive the threat warning or indication and add it to the trigger event list 132. For example, a threat warning may indicate that a process has engaged in other suspicious behavior. In such an embodiment, at 204 in method 200, a process may be identified has having performed a trigger event at any point of execution. A skilled person will understand that the cryptographic event counter is not required for such a detection of a suspicious process.

In some embodiments, it may be desirable, after a process has been allowed to execute either because the process is included in the whitelist at 206 or because the process is determined to be allowed to execute at 212, to continue to monitor the process while it is executing to evaluate whether the process may be a suspicious process.

Figure 4:
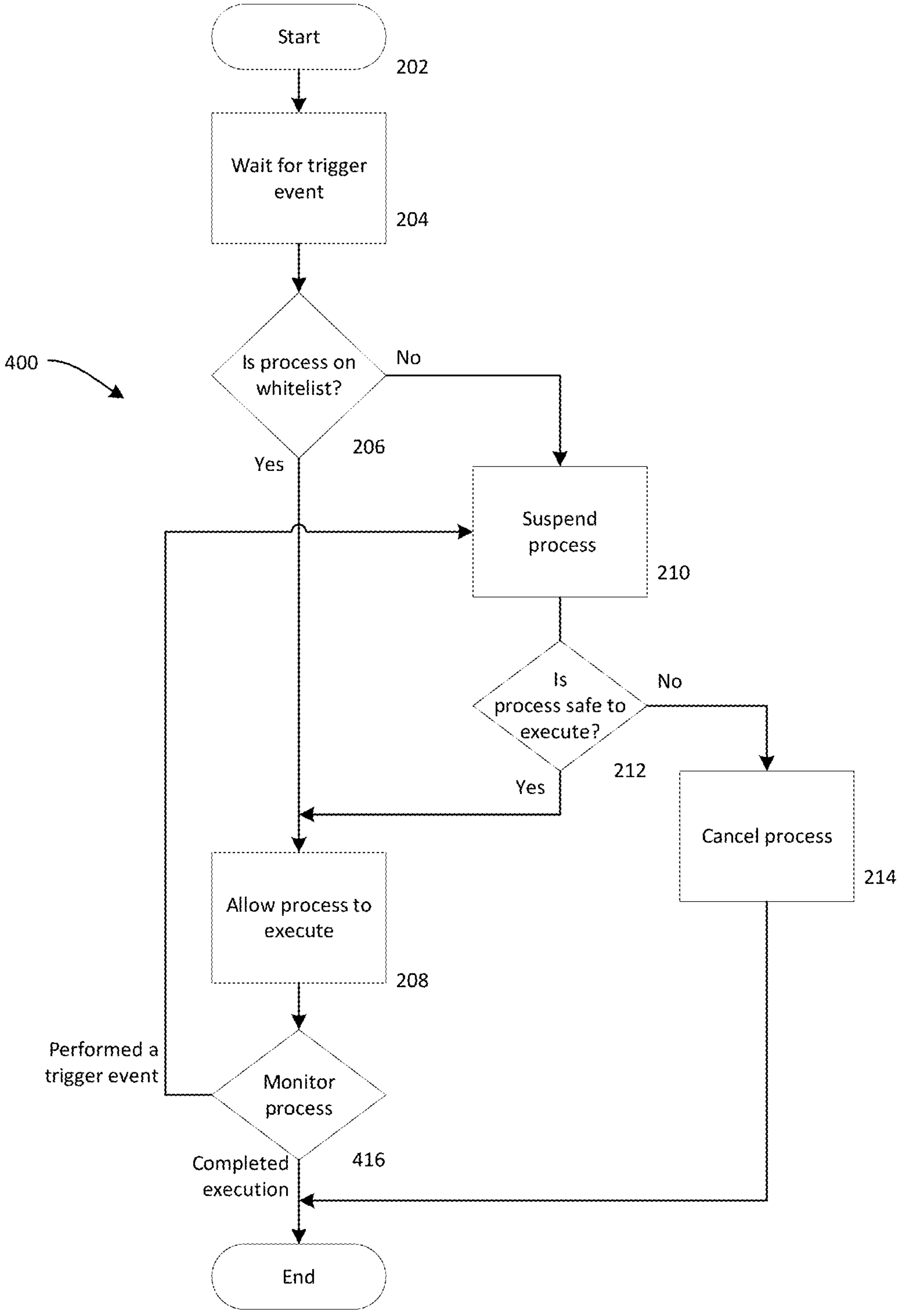
FIGS. 4-7 illustrate other methods method of identifying a suspicious process and performing a cryptographic risk assessment procedure.

Reference is made to FIG. 4, which illustrates a method 400 by which the incident module 112 may monitor and detect a potential cybersecurity threat from a process that has previously been permitted to execute. Method 400 is similar to method 200 and similar stages in that the methods are identified with corresponding reference numerals.

The trigger event list 132 may include events that can take place during ongoing execution of a process.

Some trigger events may be based on the typical or ordinary operation of a process. For example, a trigger event may be that a process has performed 10% more cryptographic operations than it typically performs during its ordinary operation. The record for a process in the whitelist 130 may include a number of cryptographic operations that the process typically performs. Such a trigger event may be considered to have been performed by a process if it exceeds its typical number of cryptographic operations by the specified amount.

In method 400, after a process is permitted to execute at 208, method 400 proceeds to 416, in which the incident module 112 continues to monitor the operation of the process and its use of the cryptographic module 106. If the process completes its operations, the method ends. However, if the process performs a trigger event, the method proceeds to 210, where the incident module 112 suspends execution of the process and, at 212, performs a determination analysis.

In method 400, a process may be determined to be a suspicious process at 416 if a threat indication is received from an external computing system while the process is operating.

In various embodiments, at 416, a process that was previously permitted to execute at 206 because the process was included in the whitelist 130 may be treated differently than a process that was permitted to execute following a determination procedure at 212. For example, a process that is on the whitelist may be exempted from further monitoring at 416, on the basis that the process has already been determined to be safe to execute and so does not require further scrutiny. In some embodiments, a process that was permitted to execute based on a determination procedure may be permitted to execute on the basis that a user has proactively determined that the process is safe to execute. In some embodiments, a process that is on the whitelist may be evaluated using different trigger events than a process that is not on the whitelist but is permitted to execute based on a determination procedure at 212. For example, a process on the whitelist may have less strict trigger events than a process permitted to execute at 212.

Figure 5:
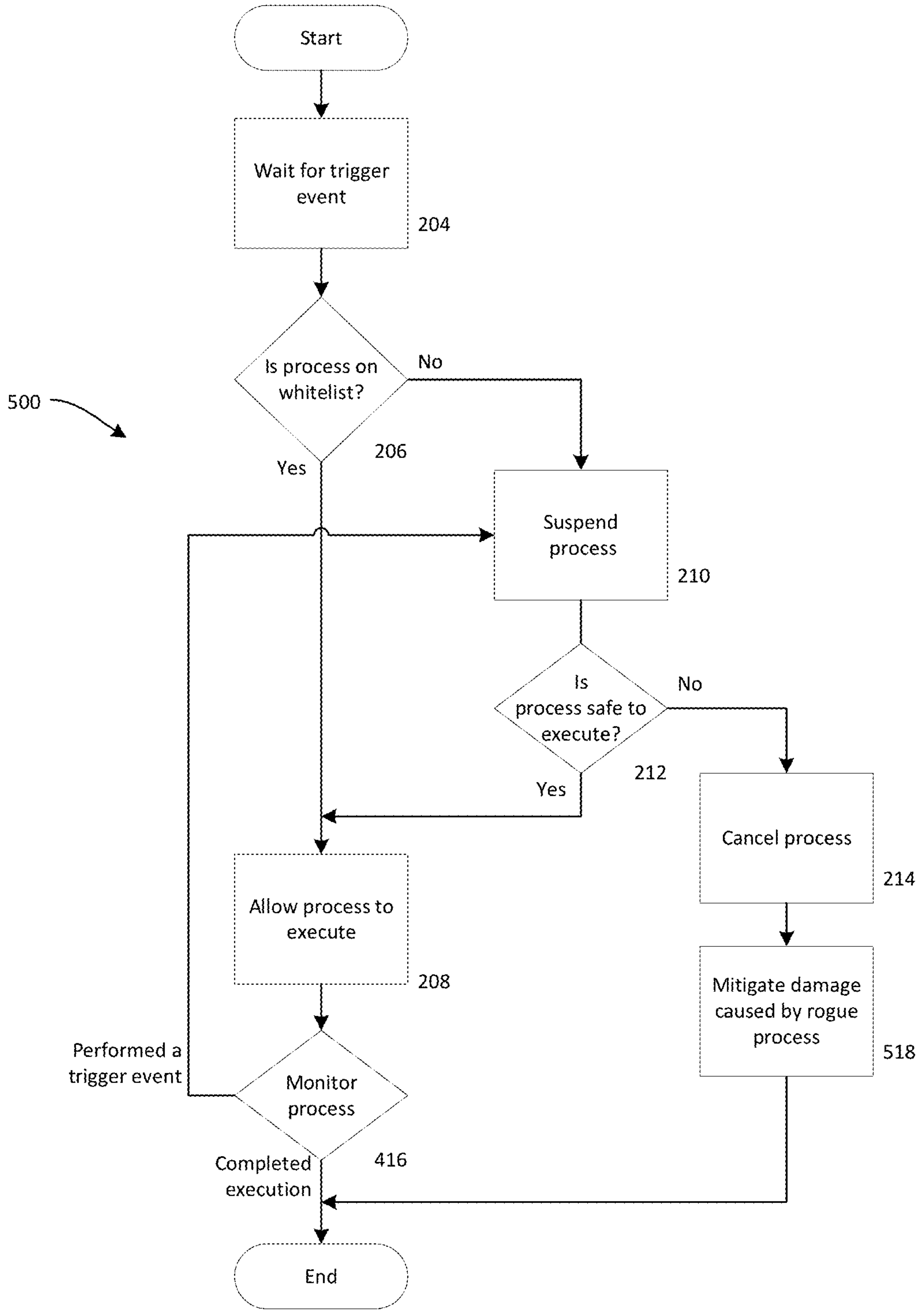

In some embodiments, it may be desirable to attempt to mitigate the effects of a cyberattack by a process that has been cancelled at 214. Reference is made to FIG. 5, which illustrates a method 500 by which the incident module 112 may attempt to mitigate the effects of a cyberattack. Method 500 is similar to methods 200 and 400, and similar stages in the methods are identified with corresponding reference numerals.

In method 500, after a suspicious process is cancelled at 214, the incident module 112 attempts to mitigate any damage done by the process. In some situations, a rogue process may be able to modify several items of protected data stored in the protected data store 114 before the process is suspended at 210. The incident module 112 may attempt to undo the damage done by the rogue process. For example, the incident module may identify data modified by the rogue process. The incident module 112 may attempt to recover the previous versions of any modified data items by retrieving them from a backup data set. In some embodiments, the mitigation process may take place automatically. In other embodiments, the mitigation process may provide information about mitigation options to a user, who may then be able to approve or skip the attempt to mitigate damage done by the suspicious process.

A common form of cyberattack is for a rogue process to attempt to encrypt protected data stored in a protected data store. Persons who have deployed such rogue processes may then demand the payment of a ransom in order to provide a decryption key that would allow the data's owner to decrypt the data and restore it to its prior state (which may itself be an encrypted state, but one that is accessible to and usable by the computing system 102 and the cryptographic module 106). Computing system 102 may be able to stop such an attack by suspending the rogue process quickly after it has begun carrying out cryptographic operations. In the event that a rogue process is able to encrypt some data in the protected data store, following cancelling of the rogue process (or possibly after suspension of the rogue process), at 518, the incident module may attempt to recover encrypted data from a backup data set.

Figure 6:
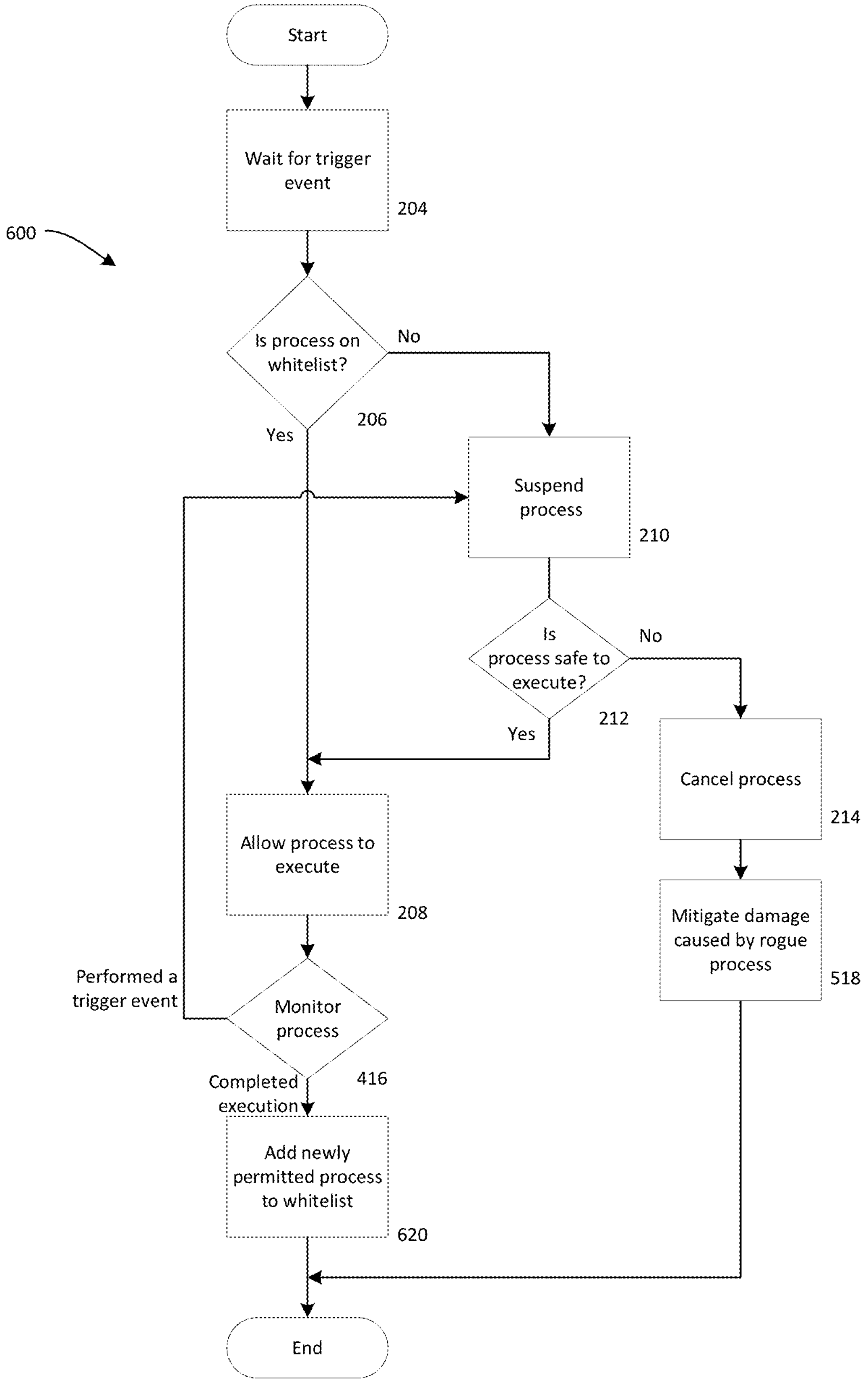

In some embodiments, it may be desirable to add a process to the whitelist after it has been determined to be safe to execute. Reference is made to FIG. 6, which illustrates a method 600 by which a new process may be added to the whitelist 130. Method 600 is similar to the methods described above, and similar stages in the methods are identified with corresponding reference numerals. In method 600, after a process completes execution at 416, the method proceeds to 620 in which, if the process was previously not on the whitelist 130, the process may be added to the whitelist. The incident module 112 may add a record to the whitelist 130 for the process. The record may include the name and userid of the process for use in identifying the process when it executes in the future. In various embodiments, the record may include other information as described above. In addition, the incident module 112 may record the number of cryptographic operations requested by the newly permitted module. In various embodiments, the incident module may record the number of various types of cryptographic operations requested by the newly permitted process. This information may be used in the future to verify that the process is on the whitelist at 206 and may be used to monitor the process during execution at 416.

Figure 7:
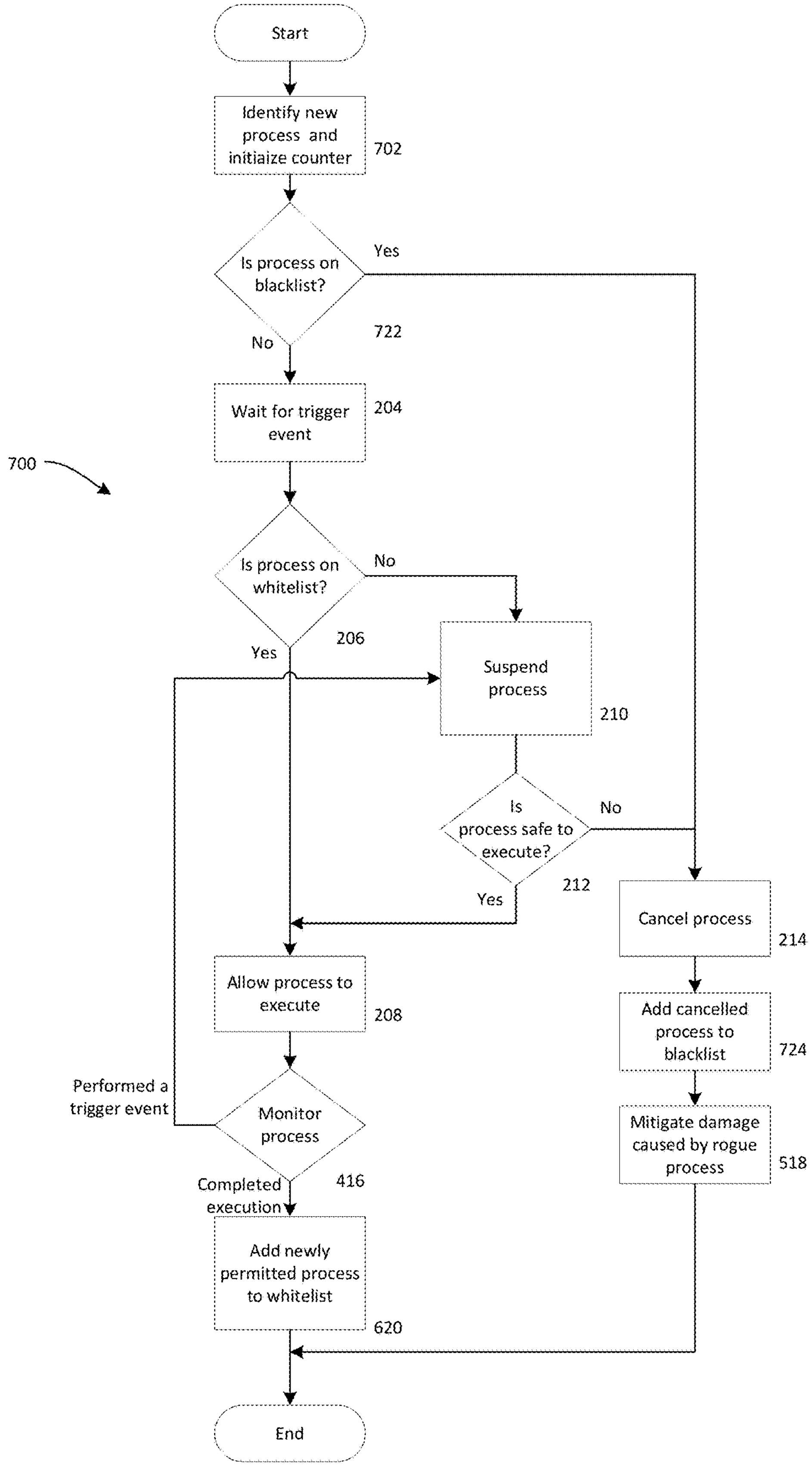

Reference is made to FIG. 7. In some embodiments, it may be desirable to keep a record of processes that have been cancelled following a determination procedure at 212. The record of such processes may be referred to as a blacklist. It may be desirable to block such processes from operating at all in computing system 102 to reduce the risk of such processes accessing or damaging protected data stored in the protected data store 114.

Method 700 begins at step 702, in which the incident module determines that a new process has begun executing. For example, the incident module 112 may monitor a list of executing processes maintained by an operating system that controls the operation of computing system 102.

After a new process is identified at 702, the method proceeds to 722, in which the incident module determines whether the new activated process is on the blacklist. If so, the method proceeds to 214 and the process is cancelled. If not, the method proceeds to 204.

In method 700, after a suspicious process is cancelled at 214, the method proceeds to 724, in which the process is added to a blacklist (not shown) maintained by the incident module 112. The blacklist may contain records for processes that have been determined to be unsafe to execute or otherwise not permitted to execute. The record for each unpermitted process may contain the name of the executable file for the process, and other information that may be used to securely identify the unpermitted process. If a process is already on the blacklist, it may not be added again, but information about the process, such as the time at which it was mostly recently initiated may be updated.

Methods 200, 400, 500, 600 and 700 illustrate various processes by which a suspicious process may be identified and for performing a cybersecurity risk assessment procedure. The whitelist 130 used in the methods may be assembled manually, automatically or by a combination of methods. A whitelist may be assembled automatically for allowing computing system 102 to operate in a known safe condition, during which it is believed that no rogue or suspicious processes are executing. Each process that carries out a trigger event during the safe operation of the computing system 102 may be added to the whitelist, as set out above in relation to element 620 of method 600.

The present invention has been described here by way of example only. Various modification and variations may be made to these exemplary embodiments without departing from the spirit and scope of the invention, which is limited only by the appended claims.

We claim:

1. A computer implemented method for detecting when a process being executed is suspicious, and determining whether the process should be interrupted, the method comprising:

defining a first trigger event, wherein the first trigger event relates to a first threshold count of cryptographic operations;

determining whether the process is on a blacklist of processes; and when the process is on the blacklist of processes, then terminating the process;

monitoring a cryptographic operation counter for the process, the cryptographic operation counter indicating a count of cryptographic operations performed at request of the process, wherein the cryptographic operation counter is a per-process counter that is initialized when the process first requests a cryptographic operation and wherein the cryptographic operation counter is incremented each time the process makes a request for a cryptographic operation, wherein each cryptographic operation utilizes a cryptographic module to access or modify data stored in a protected data store;

determining that the process has executed the first trigger event, the first trigger event being defined in relation to the cryptographic operation counter exceeding the first threshold count of cryptographic operations;

determining whether the process is included in a whitelist of permitted processes;

when the process is included in the whitelist, permitting the process to continue executing, and when the process is not included in the whitelist, then:

suspending execution of the process;

initiating a first determination procedure;

receiving an input from the first determination procedure; and based on a determination from the first determination procedure, either terminating the process or permitting the process to continue executing; and after the process has been permitted to continue executing:

determining that the process has executed a second trigger event, the second trigger event being defined in relation to the cryptographic operation counter exceeding a second threshold count of cryptographic operations, the second trigger event being different for processes permitted to continue executing based on inclusion in the whitelist compared with processes permitted to continue executing based on the determination from the first determination procedure;

suspending execution of the process;

initiating a second determination procedure;

receiving an input from the second determination procedure; and based on a determination from the second determination procedure, either terminating the process or permitting the process to continue executing.

2. The computer implemented method of claim 1 wherein the first threshold count of cryptographic operations is one.

3. The computer implemented method of claim 1 wherein the second trigger event relates to the process exceeding the second threshold count of cryptographic operations.

4. The computer implemented method of claim 1 wherein the second trigger event relates to the process exceeding the second threshold count of cryptographic operations by a specified amount.

5. The computer implemented method of claim 1 further including, after terminating the process, attempting to mitigate modifications made by the process to data stored in a protected data store.

6. The computer implemented method of claim 5 wherein mitigating modifications made by the process includes replacing modified data with previous versions of the data.

7. The computer implemented method of claim 1 further including assembling the whitelist of permitted processes by allowing a plurality of known processes to execute and creating a record for each of the known processes based on whether the processes perform any trigger events.

8. The computer implemented method of claim 1 wherein, after the process is terminated, adding the terminated process to the blacklist of processes.

9. The computer implemented method of claim 1 further including, after terminating the process, providing mitigation options to a user and allowing the user to approve or skip a mitigation process to attempt to mitigate modifications made by the process to data stored in a protected data store.

10. A computer implemented method for detecting when a process is suspicious, and determining whether the process should be interrupted, the method comprising:

defining a plurality of trigger events;

identifying that the process has been initiated to execute;

monitoring the execution of the process including monitoring a cryptographic operation counter for the process, the cryptographic operation counter indicating a count of cryptographic operations performed at request of the process, wherein the cryptographic operation counter is a per-process counter that is initialized when the process first requests a cryptographic operation and wherein the cryptographic operation counter is incremented each time the process makes a request for a cryptographic operation, wherein each cryptographic operation utilizes a cryptographic module to access or modify data stored in a protected data store;

determining whether the process is on a blacklist of processes; and when the process is on the blacklist of processes, then terminating the process;

determining that the process has executed a first trigger event of the plurality of trigger events, the first trigger event being defined in relation to the cryptographic operation counter exceeding a first threshold count of cryptographic operations;

determining whether the process is included in a whitelist of permitted processes;

when the process is included in the whitelist, permitting the process to continue executing, and when the process is not included in the whitelist, then:

suspending execution of the process;

initiating a first determination procedure;

receiving an input from the first determination procedure; and based on a determination from the determination procedure, either terminating the process or permitting the process to continue executing; and after the process has been permitted to continue executing:

determining that the process has executed a second trigger event, the second trigger event being defined in relation to the cryptographic operation exceeding a second threshold count of cryptographic operations, and the second trigger event being different for processes permitted to continue executing based on inclusion in the whitelist compared with processes permitted to continue executing based on the determination from the first determination procedure;

suspending execution of the process;

initiating a second determination procedure;

receiving an input from the second determination procedure; and based on a determination from the second determination procedure, either terminating the process or permitting the process to continue executing.

11. The computer implemented method of claim 10 wherein at least one of the plurality of trigger events relates to a first threshold count of cryptographic operations.

12. The computer implemented method of claim 11 wherein the first threshold count of cryptographic operations is one.

13. The computer implemented method of claim 10 wherein the second trigger event relates to the process exceeding the second threshold count of cryptographic operations.

14. The computer implemented method of claim 10 wherein the second trigger event relates to the process exceeding the second threshold count of cryptographic operations by a specified amount.

15. The computer implemented method of claim 10 further including, after terminating the process, attempting to mitigate modifications made by the process to data stored in a protected data store.

16. The computer implemented method of claim 15 wherein mitigating modifications made by the process includes replacing modified data with previous versions of the data.

17. The computer implemented method of claim 10 further including assembling the whitelist of permitted processes by allowing a plurality of known processes to execute and creating a record for each of the known processes based on whether the processes perform any trigger events.

18. The computer implemented method of claim 10 wherein, after the process is terminated, adding the terminated process to the blacklist of processes.

19. The computer implemented method of claim 10 further including, after terminating the process, providing mitigation options to a user and allowing the user to approve or skip a mitigation process to attempt to mitigate modifications made by the process to data stored in a protected data store.

* * * * *